United States Patent [19]
Goff et al.

[11] Patent Number: 5,854,915
[45] Date of Patent: Dec. 29, 1998

[54] KEYBOARD CONTROLLER WITH INTEGRATED REAL TIME CLOCK FUNCTIONALITY AND METHOD THEREFOR

[75] Inventors: Lonnie C. Goff; David R. Evoy; Mark Eidson, all of Tempe, Ariz.; Brian Logsdon, Akron, Ohio

[73] Assignee: VLSI Technology, Inc., San Jose, Calif.

[21] Appl. No.: 755,202

[22] Filed: Nov. 22, 1996

[51] Int. Cl.[6] .................................................. H03K 17/94
[52] U.S. Cl. .......................... 395/500; 395/821; 395/840
[58] Field of Search ........................... 364/200; 395/800, 395/500, 821, 840, 557; 341/22

[56] References Cited

U.S. PATENT DOCUMENTS

| | | | |
|---|---|---|---|
| 4,710,869 | 12/1987 | Enokizono | 364/200 |
| 5,214,785 | 5/1993 | Fairweather | 395/800 |
| 5,610,601 | 3/1997 | Lahti et al. | 341/22 |
| 5,696,987 | 12/1997 | DeLisle et al. | 395/800 |

*Primary Examiner*—Kevin J. Teska
*Assistant Examiner*—Thuan Do
*Attorney, Agent, or Firm*—Harry M. Weiss; Jeffrey D. Moy; Harry M. Weiss & Associates, P.C.

[57] ABSTRACT

A keyboard controller for a computer system with integrated Real Time Clock (RTC) functionality. The keyboard controller has a microprocessor for controlling peripheral device bus traffic such as keyboard and mouse traffic. The microprocessor also acts as a boot device for the computer system. By programming the microprocessor to emulate RTC functions, adding a divider circuit, and having an I/O support block which stores RTC registers and an extended CMOS RAM memory block, the entire RTC FSB along with its power detection and switching circuit can be removed.

20 Claims, 2 Drawing Sheets

KEYBOARD CONTROLLER WITH INTEGRATED REAL TIME CLOCK FUNCTIONALITY AND METHOD THEREFOR

BACKGROUND OF THE INVENTION

1. Field of the Invention

This invention relates generally to computer systems and, more specifically, to a keyboard controller having integrated Real Time Clock (RTC) functionality and method therefor.

2. Description of the Prior Art

Currently, in most computer systems, mobile chipsets include a microprocessor which is built directly into the keyboard controller. The microprocessor is used to handle keyboard/mouse traffic and to act as a personal computer (PC) boot device (i.e., oscillator (OSC) turn-on, Phase Lock Loop (PLL) enabling, and clock distribution). Power and a clock signal is always supplied to the microprocessor assuming that the computer system's battery is neither depleted of energy nor removed.

The current generation of mobile chipsets also include a Real Time Clock (RTC) Functional System Block (FSB). The RTC is used to update the current time and date within the computer system without any intervention from the system processor. Like the microprocessor of the keyboard controller, power and a clock signal is always supplied to the RTC FSB. The RTC FSB includes a 256×8 CMOS RAM. The first 16 bytes (as accessed from the industry standard port 70/71 index/data registers) contain the real time clock parameters and are implemented with latches. Only the lower 128 bytes of the CMOS RAM are accessible by the port 70/71 register pair. There is no standard method for accessing the upper 128 bytes. Thus, as can be seen from the above discussion, the RTC FSB has several problems. The RTC FSB is redundant (i.e., requiring power and a clock signal), lacks functionality due to the limited amount of accessible programmable CMOS RAM, makes inefficient use of the CMOS RAM, and is non-programmable.

Therefore, a need existed to provide an improved mobile chipset. The improved mobile chipset would remove the RTC FSB from the mobile chipset and would integrate RTC functionality into the keyboard controller. The keyboard controller with integrated RTC functionality would be programmable and therefore, easily modifiable. The keyboard controller with RTC functionality would also be able to perform more functions than a standard RTC FSB since the controller would be programmable. The keyboard controller with RTC functionality would also make more efficient use of the RTC CMOS RAM. The removal of the RTC FSB from the mobile chipset will also reduce overall system cost.

SUMMARY OF THE INVENTION

In accordance with one embodiment of the present invention, it is an object of this invention to provide an improved mobile chipset which would remove the RTC FSB.

It is another object of the present invention to provide an improved mobile chipset which would allow for the removal of the RTC FSB from the mobil chipset thereby lowering overall system cost.

It is another object of the present invention to provide an improved mobile chipset which integrates RTC functionality into the keyboard controller.

It is still another object of the present invention to provide a keyboard controller with integrated RTC functionality that could perform more functions than a standard RTC FSB.

It is still another object of the present invention to provide a keyboard controller with integrated RTC functionality that is programmable and therefore easily modifiable.

It is still another object of the present invention to provide a keyboard controller with integrated RTC functionality that would make more efficient use of the RTC CMOS RAM.

BRIEF DESCRIPTION OF THE PREFERRED EMBODIMENTS

In accordance with one embodiment of the present invention, a keyboard controller for a computer system with integrated Real Time Clock (RTC) functionality is disclosed. The keyboard controller with RTC functionality uses processor means for controlling peripheral device traffic and for emulating RTC functions. Input/Output (I/O) support block means are coupled to the processor means for storing current data related to the RTC functions emulated by the processor means. Divider circuit means are coupled to the processor means for providing a pulse rate to the processor means for allowing the processor means to function and to emulate the RTC functions.

In accordance with another embodiment of the present invention, a method of providing a keyboard controller for a computer system with integrated RTC functionality is disclosed. The method comprises the steps of: providing processor means for controlling peripheral device traffic, for emulating RTC functions, and for acting as a boot device for the computer system; providing I/O support block means coupled to the processor means for storing current data related to the RTC functions emulated by the processor means; and providing divider circuit means coupled to the processor means for providing a pulse rate to the processor means for allowing the processor means to function and to emulate the RTC functions.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
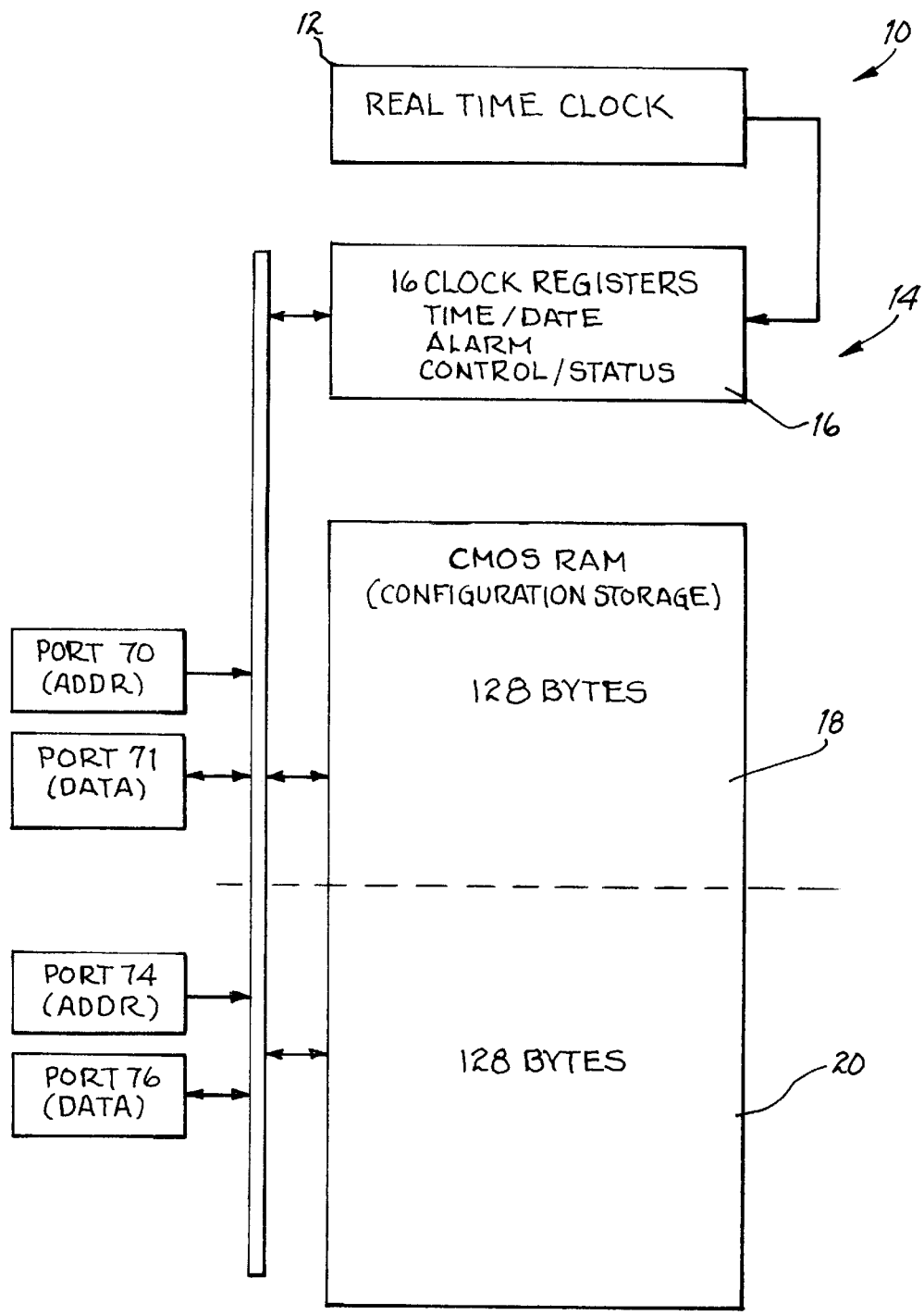
FIG. 1 is a simplified functional block diagram of a prior art Real Time Clock (RTC) Functional System Block (FSB).

As stated above, in the current generation of mobile chipsets, a microprocessor and a Real Time Clock (RTC) Functional System Block (FSB) are built into the keyboard controller. Referring to FIG. 1, the RTC FSB 10 (hereinafter RTC FSB 10) is shown. The RTC FSB 10 has a Real Time Clock (RTC) 12. The RTC 12 is used for updating the current time and date of the computer system. The RTC 12 is independent of the system processor and all other chips in the computer system. Even when the computer system is switched off or unplugged, the RTC 12 is able to update the time and date independently, since the RTC 12 is generally powered by a battery (not shown) or an accumulator (not shown).

The RTC FSB 10 also includes a block of memory 14. The memory block 14 is generally a 256×8 CMOS RAM. The first sixteen (16) bytes of the CMOS RAM block 14 are used for storing registers 16. The registers 16 are used for storing time and date data, as well as for storing control and status data of the RTC 12. The remainder of the CMOS RAM block 14 is used for storing information concerning the configuration of the computer system. Only the lower block 18 of the CMOS RAM block 14 may be accessed through Ports 70/71. However, there is no standardized method for accessing the upper block 20 of the CMOS RAM block 14.

Figure 2:
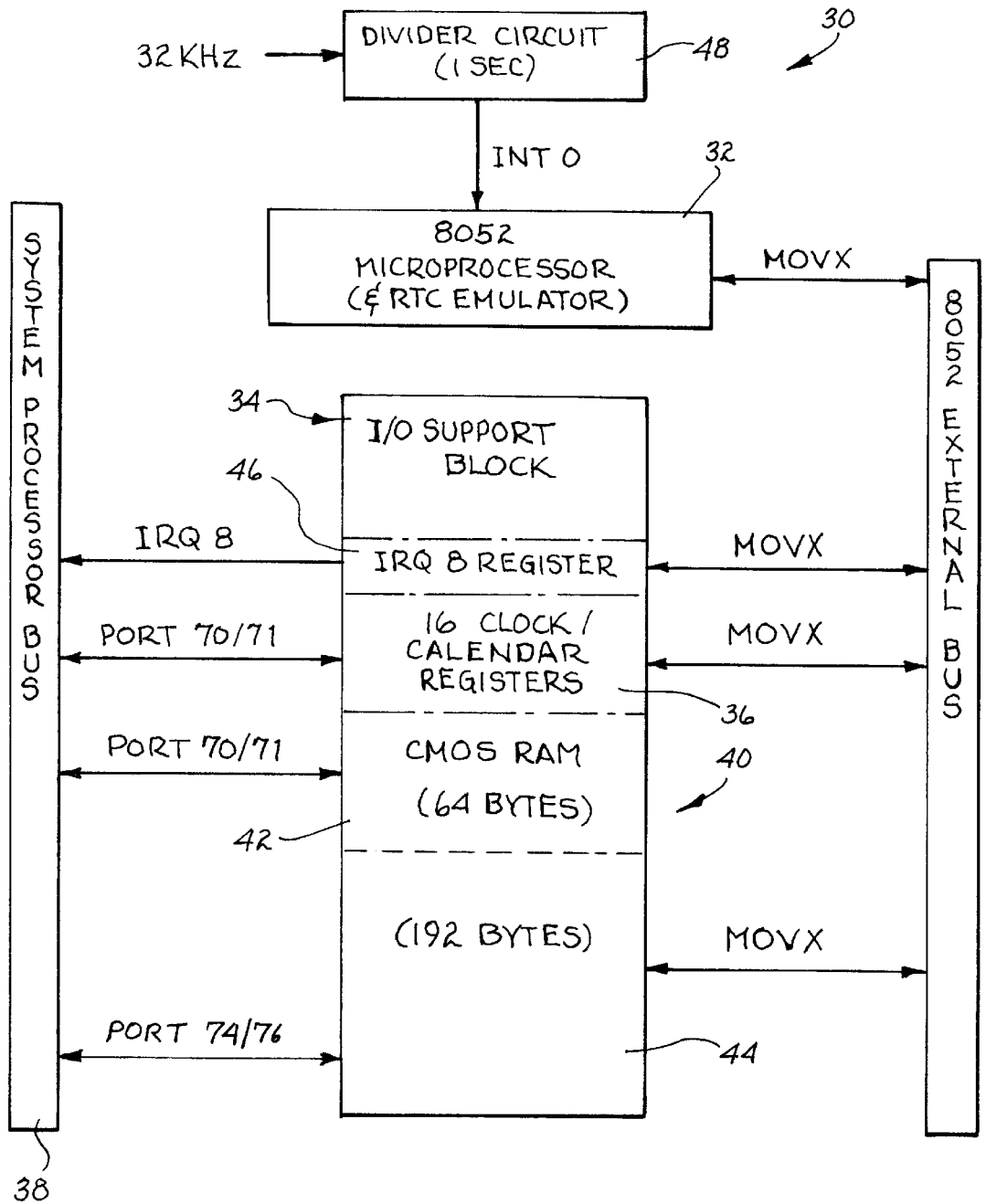
FIG. 2 is a simplified functional block diagram of a keyboard controller with integrated RTC functionality.

Referring to FIG. 2, a keyboard controller with integrated RTC functionality 30 (hereinafter controller 30) is shown. The controller 30 removes the RTC FSB 10 (FIG. 1) of the prior art and integrates the functionality of the RTC FSB 10 into the controller 30.

The controller 30 is piloted by a microprocessor 32. The microprocessor 32 is used for controlling peripheral device bus traffic such as keyboard and mouse traffic. The microprocessor 32 also acts as a boot device (i.e., oscillator (OSC) turn-on, Phase Lock Loop (PLL) enabling, and clock distribution) for the computer system. In the present invention, the microprocessor 32 has been programmed to emulate RTC functions. Thus, the microprocessor 32 is able to perform the following functions: time of day clock, alarm function, calendar function, programmable periodic interrupt output, and any other functions currently being performed by prior art RTCs.

In order to emulate RTC functionality, the microprocessor 32 needs to be coupled to an Input/Output (I/O) support block 34. The I/O support block 34 has RTC registers 36 for storing RTC data emulated by the microprocessor 32. The RTC registers 36 include, but are not limited to, registers for storing the time of day clock, alarm function, calendar function, and status and control registers. The status and control registers are used for storing control bits which are used for a plurality of functions some of which include the selection of the periodic interrupt, input divisor, update in progress status bit, various modes of operation and interrupt enables for the RTC emulated by the microprocessor 32, interrupts and internal operation of the RTC emulated by the microprocessor 32, and bits that indicates the status of the standby RAM.

In the preferred embodiment of the present invention, the RTC registers 36 will be dual ported registers. The microprocessor 32 will access the RTC registers 36 via memory mapped I/O instructions (i.e., MOV x instructions). The system processor will also be able to access the RTC registers 36. The system processor will use the system processor bus 38 and standard ports 70/71 register pair as the access method for the RTC registers 36.

The I/O support block 34 will also have a CMOS RAM memory block 40. In the preferred embodiment of the present invention, access to the CMOS RAM memory block 40 will be configurable in 64 byte memory blocks. The memory blocks may be assigned either to the system processor (accessed via standard ports 70/71 register pair) or to the microprocessor 32 (accessed via MOV x instructions). If more than 128 bytes are assigned to the system processor, the port 74/76 register pair will be used to access the higher order bytes In the preferred embodiment of the present invention, a first portion 42 of the CMOS RAM memory block 40 is used for storing configuration data of the computer system. The configuration data includes, but is not limited to, the number and types of floppy drives, graphics adapter, base memory, etc. The second portion 44 of the CMOS RAM memory block 40 can be assigned either to the system processor or to the microprocessor 32. The added memory allows for increased functionality in both the system processor and the microprocessor 32 by allowing both processors to be programmed to perform different functions. If the second portion 44 of the CMOS RAM memory block 40 is assigned to the microprocessor 32, the added memory would allow for the microprocessor 32 to function as a programmable RTC. A programmable RTC would increase functionality by allowing more features to be added to the RTC.

The I/O support block 34 is also comprised of an interrupt request register 46. The interrupt request register 46 is a memory mapped I/O register. When an RTC alarm function is signaled, the microprocessor 32 is able to trigger an interrupt request through the interrupt request register 46 to the computer system. The microprocessor 32 can also signal other type of interrupt request to the computer system through the interrupt request register 46. There is, from a practical perspective, no limit to the number and types of alarms/interrupts which can be generated.

The controller 30 is further comprised of a divider circuit 48. The divider circuit 48 is coupled to the microprocessor 32. The divider circuit 48 is used for providing a pulse rate to the microprocessor 32 and for allowing the microprocessor 32 to function and to emulate RTC functions. In the preferred embodiment the divider circuit will generate a one-second output. This output from the divider circuit 48 can generate a processor interrupt with the appropriate status bit set in an interrupt source register. This functionality is required in order to keep the RTC functionality of the microprocessor 32 running when the microprocessor 32 is suspended (i.e., low power mode with the clock signal (32 kHz) enabled. On average it will take the microprocessor 32 less than 9 ms to update the RTC when the microprocessor is being driven by the slow speed 32 kHz clock.

While the invention has been particularly shown and described with reference to preferred embodiments thereof, it will be understood by those skilled in the art that the foregoing and other changes in form, and details may be made therein without departing from the spirit and scope of the invention.

I claim:

1. A keyboard controller for a computer system with integrated Real Time Clock (RTC) functionality comprising, in combination:

processor means for controlling peripheral device traffic and for emulating RTC functions;

I/O support block means coupled to said processor means for storing current data related to said RTC functions emulated by said processor means; and divider circuit means coupled to said processor means for providing a pulse rate to said processor means for allowing said processor means to function and to emulate said RTC functions.

2. A keyboard controller for a computer system with integrated RTC functionality in accordance with claim 1 wherein said processor means further acts as a boot device for said computer system.

3. A keyboard controller for a computer system with integrated RTC functionality in accordance with claim 1 wherein said I/O support block means stores current configuration data of said computer system, current time and date data for said computer system, and current interrupt data of said computer system.

4. A keyboard controller for a computer system with integrated RTC functionality in accordance with claim 1 wherein said I/O support block means comprises:

RTC register means for storing time and date data, for storing data indicating different RTC interrupt requests, and for storing status data indicating current operating conditions of said RTC functions emulated by said processor means;

system interrupt register means for storing data to assert said different RTC interrupt requests to said computer system; and first memory block means for storing configuration data of said computer system.

5. A keyboard controller for a computer system with integrated RTC functionality in accordance with claim 4 wherein said RTC register means are dual ported registers.

6. A keyboard controller for a computer system with integrated RTC functionality in accordance with claim 4 wherein said RTC register means comprises:

clock-date register means for storing time of day data, alarm function data, and calendar function data; and RTC control status registers for storing data indicating said RTC interrupt requests, for storing data to program periodic interrupts, and for storing data to set a current mode of operation for said processor means to emulate said RTC functions.

7. A keyboard controller for a computer system with integrated RTC functionality in accordance with claim 4 wherein said I/O support block means further comprises second memory block means which can be assigned to a system processor for increasing functionality of said system processor by allowing said system processor to be reconfigured to perform additional functions.

8. A keyboard controller for a computer system with integrated RTC functionality in accordance with claim 4 wherein said I/O support block means further comprises second memory block means which can be assigned to said processor means for increasing functionality of said processor means by allowing said processor means to be reconfigured to perform additional functions.

9. A keyboard controller for a computer system with integrated RTC functionality in accordance with claim 1 wherein said divider circuit means generates an output to allow said processor means to provide updated RTC functions when said processor means is suspended.

10. A keyboard controller for a computer system with integrated Real Time Clock (RTC) functionality comprising, in combination:

processor means for controlling peripheral device traffic, for emulating RTC functions, and for acting as a boot device for said computer system;

I/O support block means coupled to said processor means for storing current data related to said RTC functions emulated by said processor means, said I/O support block comprising:

RTC register means for storing time and date data, for storing data indicating different RTC interrupt requests, and for storing status data indicating current operating conditions of said RTC functions emulated by said processor means, said RTC register means comprising:

clock-date register means for storing time of day data, alarm function data, and calendar function data; and RTC control status registers for storing data indicating said RTC interrupt requests, for storing data to program periodic interrupts, and for storing data to set a current mode of operation for said processor means to emulate said RTC functions;

system interrupt register means for storing data to assert said different RTC interrupt requests to said computer system; and first memory block means for storing configuration data of said computer system; and divider circuit means coupled to said processor means for providing a pulse rate to said processor means for allowing said processor means to function and to emulate RTC functionality and for generating an output to allow said processor means to provide updated RTC functions when said processor means is suspended.

11. A keyboard controller for a computer system with integrated RTC functionality in accordance with claim 10 wherein said RTC register means are dual ported registers.

12. A keyboard controller for a computer system with integrated RTC functionality in accordance with claim 10 wherein said I/O support block means further comprises second memory block means which can be assigned to a system processor for increasing functionality of said system processor by allowing said system processor to be reconfigured to perform additional functions.

13. A keyboard controller for a computer system with integrated RTC functionality in accordance with claim 10 wherein said I/O support block means further comprises second memory block means which can be assigned to said processor means for increasing functionality of said processor means by allowing said processor means to be reconfigured to perform additional functions.

14. A method of providing a keyboard controller for a computer system with integrated Real Time Clock (RTC) functionality comprising the steps of:

providing processor means for controlling peripheral device traffic, for emulating RTC functions, and for acting as a boot device for said computer system;

providing I/O support block means coupled to said processor means for storing current data related to said RTC functions emulated by said processor means; and providing divider circuit means coupled to said processor means for providing a pulse rate to said processor means for allowing said processor means to function and to emulate said RTC functions.

15. The method of claim 14 wherein said step of providing I/O support block means further comprises the step of providing I/O support block means for storing current configuration data of said computer system, current time and date data for said computer system, and current interrupt data of said computer system.

16. The method of claim 14 wherein said step of providing I/O support block means further comprises the steps of:

providing RTC register means for storing time and date data, for storing data indicating different RTC interrupt requests, and for storing status data indicating current operating conditions of said RTC functions emulated by said processor means;

providing system interrupt register means for storing data to assert said different RTC interrupt requests to said computer system; and providing first memory block means for storing configuration data of said computer system.

17. The method of claim 16 wherein said step of providing RTC register means further comprises the steps of:

providing clock-date register means for storing time of day data, alarm function data, and calendar function data; and providing RTC control status registers for storing data indicating said RTC interrupt requests, for storing data to program periodic interrupts, and for storing data to set a current mode of operation for said processor means to emulate said RTC functions.

18. The method of claim 16 wherein said step of providing I/O support block means further comprises the step of providing second memory block means which can be assigned to a system processor for increasing functionality of said system processor by allowing said system processor to be reconfigured to perform additional functions.

19. The method of claim 16 wherein said step of providing I/O support block means further comprises the step of providing second memory block means which can be assigned to said processor means for increasing functionality of said processor means by allowing said processor means to be reconfigured to perform additional functions.

20. The method of claim 14 wherein said step of providing divider circuit means further comprises the step of providing divider circuit means which generates an output to allow said processor means to provide updated RTC functions when said processor means is suspended.

* * * * *